No. 771,055. PATENTED SEPT. 27, 1904.
C. FRANCKE.
MACHINE FOR MAKING ACCUMULATOR PLATES.
APPLICATION FILED NOV. 4, 1902.
NO MODEL. 2 SHEETS—SHEET 1.
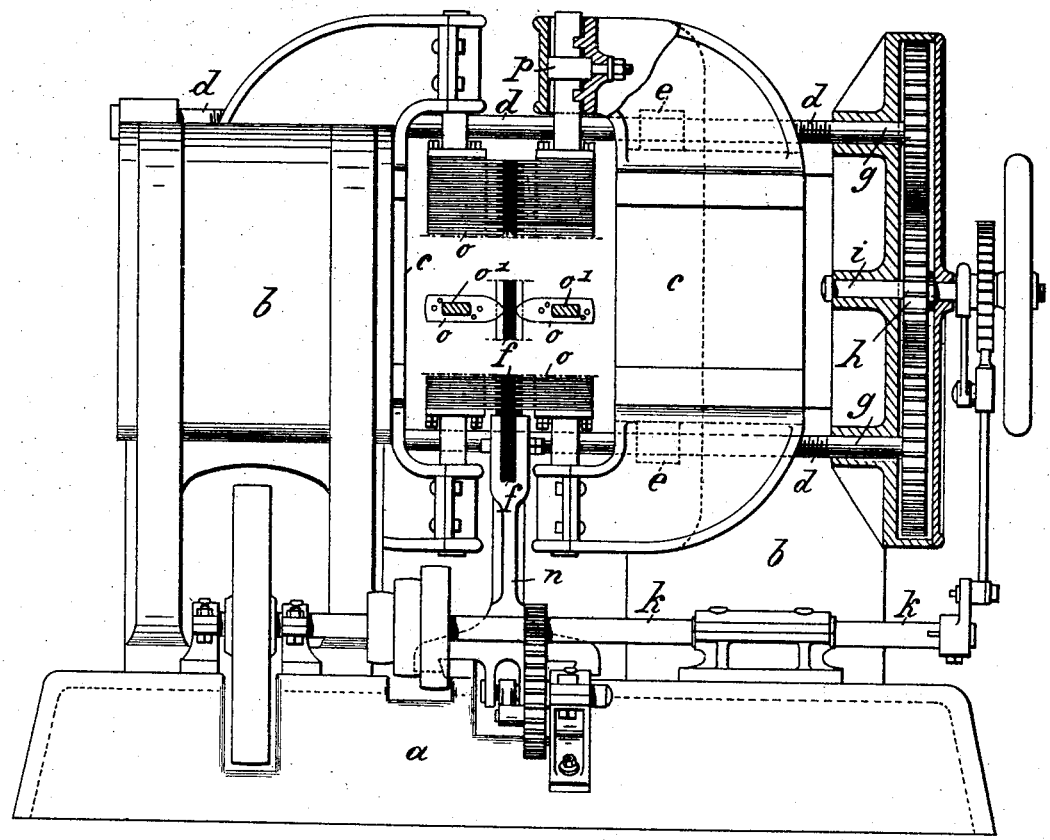
Fig. 1.
WITNESSES
INVENTOR
Carl Francke
By 
ATTORNEYS

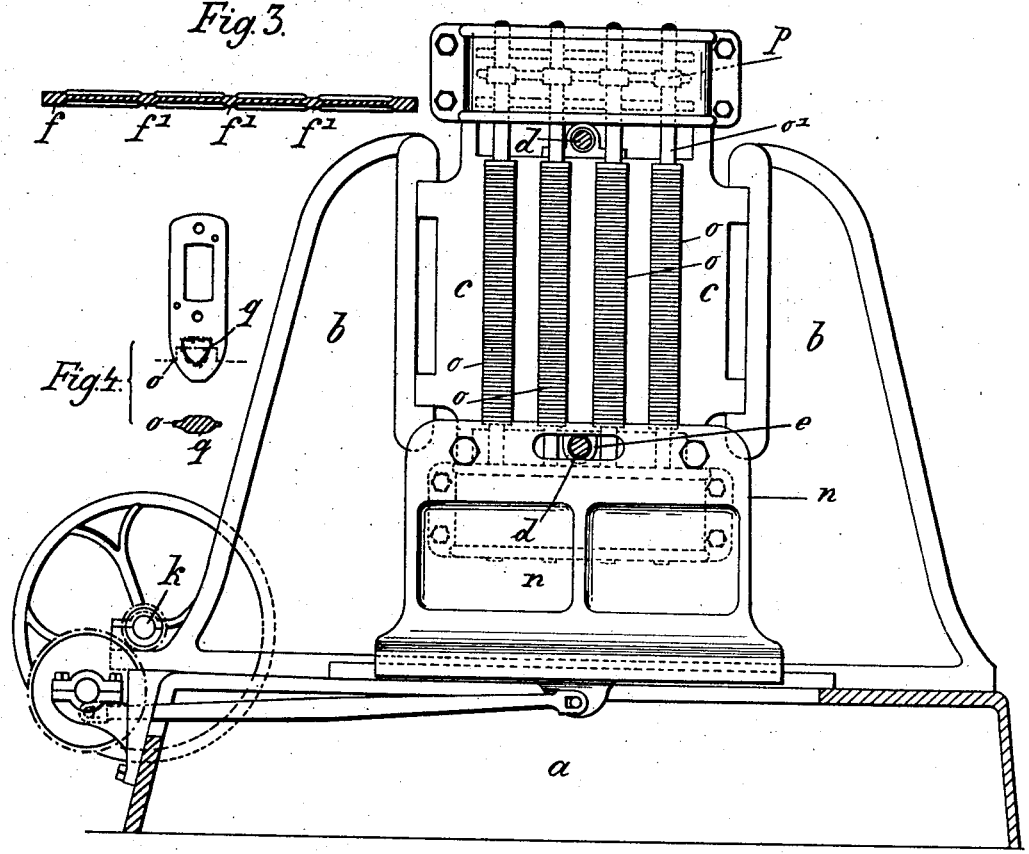

No. 771,055.

Patented September 27, 1904.

UNITED STATES PATENT OFFICE.

CARL FRANCKE, OF SCHÖNEBERG, GERMANY, ASSIGNOR TO HANS HEIMANN, OF BERLIN, GERMANY.

MACHINE FOR MAKING ACCUMULATOR-PLATES.

SPECIFICATION forming part of Letters Patent No. 771,055, dated September 27, 1904.

Application filed November 4, 1902. Serial No. 130,064. (No model.)

*To all whom it may concern:*

Be it known that I, CARL FRANCKE, a subject of the Emperor of Germany, residing at Schöneberg, near Berlin, Germany, have invented certain new and useful Improvements in the Production of Accumulator-Plates, of which the following is a specification.

This invention presents an improved machine in which a series or gangs of such series of knife-like tools is held rigidly in proper relation to each other and is made to reciprocate in relation to the plate to be operated on, each tool operating to plow the surface and to force up blades of the metal between adjacent tools. The knife-like tools are of special form, and the arrangement of the gangs and corresponding reciprocal motion are special to this machine.

I have illustrated my invention in the accompanying drawings, in which—

Figure 1 shows a front view of my said improved machine. Fig. 2 shows a side view of the same. Fig. 3 shows a section of the lead plate formed by my machine, and Fig. 4 shows a side elevation and section of the knife-like tool.

In the drawings the machine is shown having a bed $a$, carrying two standards $b\ b$ at each end for supporting and guiding the tool-carriers $c\ c$. Two shafts $d\ d$ are shown, one on each side, mounted in bearings $g$ on the standards. These shafts extend across the machine and each is threaded at each end, the threads at one end being right hand and at the other left hand. On these are corresponding nuts $e\ e$, which are fixed to or form part of the tool-carriers $c$. When these shafts, therefore, are turned in one direction, the nuts are caused to approach each other, and when the shafts are turned in the opposite direction the nuts recede from each other, and the tool-carriers, which are arranged with the points of the gangs of tools opposite to and facing each other, are thus made to gradually approach toward or recede from each other. The space between is occupied by the plate to be operated upon, and the motion of the parts is so regulated that the points on opposite sides of the plate will enter a proper distance, and to whatever distance they are caused to enter they are firmly held by means of the nuts on the shafts. The shafts are turned by means of suitable connections and gears, as shown. These connections and gears are the cogged wheels $h$ and the shaft $i$, the shaft of the wheel being driven from the driving-shaft $k$ by means of the pawl $m$. The pawl may be thrown out of connection and the shaft $i$ be operated through the hand-wheel $l$.

The knife-shaped tools $o$ are formed with parabolic cutting edges, as shown in Fig. 4, and have sides of special form, as shown in said figure. These edges are symmetrical, and above and within the edges these tools have thickened or projecting portions, with plain lateral surfaces, as shown, so that when the machine is in operation the tools pressed inwardly plow the plates when the reciprocating motion is begun. The thin point of the tool and the forward edge advancing in lines parallel with the surface of the plate operated upon cuts its path, and the lead fin (or whatever the metal may be) thus formed moves between the raised portions of the tools on opposite sides, which crowd and compress the metal and condense and force it upward, and this is done whether the plate moves one way or the other. The tools $o$ have holes in the shank portions in shape conforming to the bed $o'$, by means of which they are shifted on to and secured upon the bars, and these bars are clamped at each end to the U-shaped carriers $c\ c$ by means of clamping-bolts $p$.

The plate to be operated upon is gripped upon and carried by a reciprocating carriage $n$, guided in the bed of the machine, the plate being held and moved in a plane passing centrally through the space between the points of the opposing gangs of tools, so that equal operations are simultaneously effected on each side of said plate. The carriage is caused to reciprocate by means of the shaft $k$, operating through gearing, and a crank and connecting-rod between the crank-pin and the carriage. The slow motion by which the tools are forced into the plate continues while the plate is reciprocated. Four gangs of the knife-like tools are shown, and the plate is set between them, so that the tools on each bar (constituting what may be called a "set") operate simultaneously, each in its own field. The movement of reciprocation is less than the distance between the sets of the gang, so that portions of the plate are uncut and are left in the form of bars $f'$ between the grooved parts or series of fins, and these serve to increase the strength of the finished plate, as is well known. This simultaneous reciprocation of a gang of series of tools over all the surface and with movement covering only a small part of the entire surface of the plates facilitates the operation of forming accumulator-plates, since no intermittent raising and lowering is required to form the bars, and at the same time the form of these reciprocated tools produces a better form of fin or rib and a better plate.

It will be plain that instead of reciprocating the plate the plate may be held stationary and the knives reciprocated, and I include this modification in my claims.

I claim—

1. A machine for forming accumulator-plates, comprising a series of knife-like tools arranged to form simultaneously a series of contiguous grooves, and fins between said grooves in the plate, by movement in right lines, and a carriage for said plate, mechanism for forcing said series of tools into the plate, and mechanism for causing a relative movement of the carriage and tools, whereby the tools are caused to cut grooves in the surface of said plate, and form fins thereon, substantially as described.

2. In a machine for forming grooves and fins on the surface of accumulator-plates, a knife-like tool having a parabolic cutting edge, and a thickened portion $g$.

In witness whereof I have hereunto set my hand in presence of two witnesses.

CARL FRANCKE.

Witnesses:
HENRY HASPER,
WOLDEMAR HAUPT.